United States Patent Office 3,808,266
Patented Apr. 30, 1974

3,808,266
PROCESS FOR THE PREPARATION OF 4-AMINO-METHYLCYCLOHEXANE-1-CARBOXYLIC ACID
Masao Murayama and Eisuke Seto, Kyoto, Takashi Okubo, Uji, and Iwao Morita and Itsuo Dobashi, Kyoto, Japan, assignors to Nippon Shinysku Co., Ltd., Kyoto, Japan
No Drawing. Filed Nov. 6, 1970, Ser. No. 87,582
Claims priority, application Japan, Nov. 29, 1969, 44/95,862, 44/95,863, 44/95,864, 44/95,865
Int. Cl. C07c 5/38, 101/04
U.S. Cl. 260—514 J          6 Claims

ABSTRACT OF THE DISCLOSURE 4-aminomethylcyclohexane-1-carboxylic acid, abundant in its trans-isomer and useful as a hemostatic, is manufactured by the following steps; thus, 4-oxocyclohexane-1,1-dicarboxylic acid diester (V) is made to react with cyanhydrin or with alkali cyanide, the resulting 4-cyano-4-hydroxycyclohexane-1,1-dicarboxylic acid (IV) or esters thereof is dehydrated and, if necessary, hydrolyzed and/or alkylated, the resulting 4-cyano-3-cyclohexene-1,1-dicarboxylic acid (III) or esters thereof is reduced and, if necessary, hydrolyzed, and the resulting 4-aminomethylcyclohexane - 1,1-dicarboxylic acid or mono- or diester thereof is decarboxylated and, if necessary, hydrolyzed to give the desired 4 - aminomethylcyclohexane-1-carboxylic acid (I) abundant in its trans-isomer.

This invention relates to a process for the preparation of 4 - aminomethylcyclohexane-1-carboxylic acid represented by the following formula

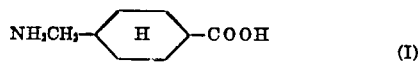

(I)

The compound prepared in accordance with the present invention, particularly the trans-isomer thereof, has a hemostatic action and other advantageous pharmacological actions; therefore, it is useful as a medicine, particularly, as a hemostatic.

When the compound of the invention is prepared in a conventional chemical reaction, however, there is obtained its cis-isomer which is inferior in pharmacological effects. Thus, much complicated and troublesome operation is necessary to convert the resulting cis-isomers compound into the trans-isomer and, therefore, the above conventional method is not satisfactory from the viewpoint of the pharmaceutical and chemical industry.

Unexpectedly, we have now found, as the result of our extended researches on the improvement of the previous methods, that the desired trans-isomer can be obtained in extremely high yield if the corresponding dicarboxylic acid is decarboxylated.

Thus, the present invention concerns a process for the preparation of the desired product (I) which, in its final step, comprises decarboxylating 4 - aminomethylcyclohexane-1,1-dicarboxylic acid or esters thereof represented by the following general formula

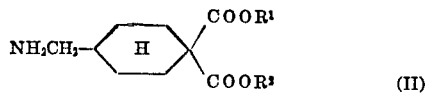

(II)

wherein $R^1$ and $R^2$ have the same or different meanings and stand for hydrogen or lower alkyl groups, and, when at least one of $R^1$ and $R^2$ is a lower alkyl group, simultaneously hydrolyzing the same.

The decarboxylation in accordance with the present invention may be effected in various manners known for decarboxylation, but it is particularly advisable to heat the starting material in an acidic solvent, preferably, in a mineral acid solvent such as sulfuric acid, hydrobromic acid, and hydrochloric acid, or to heat in a solvent having a high boiling point such as diethylene glycol and quinoline, optionally in the presence of a catalyst.

The temperatures for heating are preferably in the range of from about 100° C. to 230° C. but may be outside of such range.

It is one of the most outstanding characteristics of the present invention that 4-aminomethylcyclohexane-1-carboxylic acid obtained by the method in accordance with the invention is mostly in the form of its trans-isomer having a hemostatic action, while such compound having been prepared according to previous methods was mostly in the form of its cis-isomer of no value. Thus, up to ca. 90% of the product is the trans-isomer, and, though somewhat variable depending upon the conditions for the decarboxylation, it rarely occurs that the proportion of the trans-isomer to all the product becomes less than 70%.

Such results cannot be readily derived from previous knowledge, and succeeded in overcoming the prior art disadvantage that the cis-isomer is produced in large quantities thereby obtaining the pharmacologically active substance in high yield.

The starting material in the above reaction, i.e. (II), is novel and is manufactured as follows: 4-cyano-3-cyclohexene-1,1-dicarboxylic acid or an ester thereof represented by the following general formula

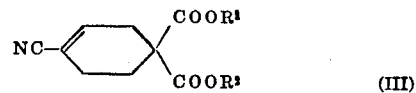

(III)

wherein $R^1$ and $R^2$ have the same meaning as above, is reduced to give 4 - aminomethylcyclohexane-1,1-dicarboxylic acid or the ester thereof, the ester, if necessary, being hydrolyzed to yield 4-aminomethylcyclohexane-1,1-dicarboxylic acid.

In the reduction reaction step as illustrated above, there are employed various known reducing agents, that is, for example, hydrogen and catalysts such as nickel, platinum and palladium, metals such as aluminum, iznc, iron and sodium and acids, bases or organic solvents, stannous chloride, ferrous sulfate, sulfurous acid and the salts thereof, sodium hydrosulfite, sodium borohydride, lithium aluminum hydride, hydrogen sulfide and its compounds, hydrogen iodide, alcohols, aldehydes, organic acids and amines. Above all, the method employing a catalytic reduction is most advantageous in the above reaction.

The catalytic reduction may be preferably carried out in an organic solvent or water-containing organic solvent such as methanol and ethanol containing water, using a catalyst such as Raney-nickel in the presence of ammonia, or using a palladium-carbon catalyst in the presence of hydrochloric acid. The catalytic reduction may be effected at normal temperatures or with heating, or at normal pressures or under pressures, but the purpose of the catalytic reduction can be sufficiently achieved by carrying out at normal temperatures and normal pressures.

The amount of the secondary amine contained in the reduction products is extremely small and the desired product (II) or the primary amine, can be obtained in good yield. When $R^1$ and $R^2$ are alkyl groups, the ester product is in the form of an oily substance which can form salts with acids, and, without further purification, converted, via hydrolysis with an acid or alkali, to the corresponding carboxylic acid. The carboxylic acid so reduced becomes an amphoteric substance, so that it is preferred to effect treatment, after the reduction or hydrolysis, with an ion-exchange resin.

The starting material (III) in the above reduction reaction is also new and is manufactured by treating 4-cyano-4-hydroxycyclohexane-1,1-dicarboxylic acid or an alkyl ester thereof represented by the following general formula

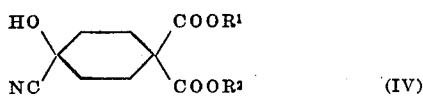

wherein $R^1$ and $R^2$ may be the same or different and stand for hydrogen or lower alkyl groups, with a dehydrating agent, optionally hydrolyzing the resulting product when it is an alkyl ester and optionally alkylating the resulting monoester or free acid.

In carrying out the dehydration in accordance with the above method, it is preferred to dissolve the starting material (IV) into an anhydrous organic solvent such as benzene, pyridine, dichloromethane and the like, adding thereto a suitable dehydrating agent such as thionyl chloride, phosphorus pentachloride and the like and allowing the resulting mixture to stand at room temperature or heating the same to a given temperature. When the product (III) so obtained is an ester, it is optionally hydrolyzed, partially or completely, with a basic compound in a polar solvent. For example, it is preferred to employ a dilute alcoholic solution of sodium hydroxide; furthermore, the different alkyl esters or mixed esters may be obtained by treating the resulting product (III) with an alkylating agent. The transesterification may be carried out simultaneously with the preceding hydrolysis step.

The starting material (IV) in the above step is also new and is manufactured by reacting 4-oxocyclohexane-1,1-dicarboxylic acid diester represented by the following general formula

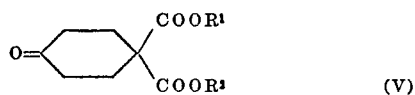

wherein $R^1$ and $R^2$ are the same as above, with cyanhydrin or with alkali cyanide.

It is preferred to employ, as the cyanhydrin, acetone cyanhydrin, whereby the presence of an organic base is preferred. As the alkali cyanide, there is employed sodium cyanide or potassium cyanide. In this case, it is convenient to carry out the treatment with an alkali cyanide after treating the starting material beforehand with a compound such as sodium acid sulfite to form an adduct.

To sum up, the present invention relates to a process for the preparation of 4-aminomethylcyclohexane-1-carboxylic acid (I), abundant in its trans-isomer and useful as a hemostatic drug, by the following steps:

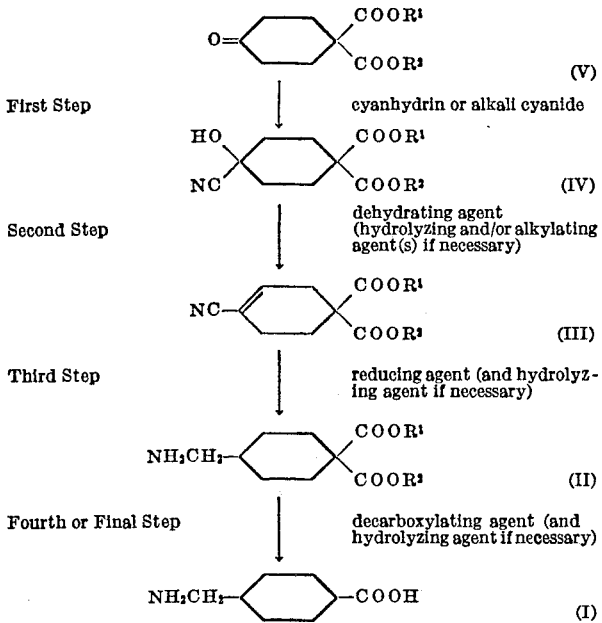

wherein $R^1$ and $R^2$ are hydrogen or the same or different lower alkyl groups.

The present invention will be described more in detail in the following illustrative examples:

In the following working examples, Examples 1, 2, 3, and 4 correspond to the first, second, third, and fourth (or final) steps in the above reaction scheme respectively.

Example 1.—Diethyl 4-cyano-4-hydroxycyclohexane-1,1-dicarboxylate [(IV) where $R^1=R^2=C_2H_5$]

(a) A mixture of diethyl 4-oxocyclohexane-1,1-dicarboxylate (2.4 g.) and acetone cyanhydrin (0.85 g.) is mixed with added triethylamine (0.5 ml.) and allowed to stand overnight, followed by concentration under reduced pressure to give quantitatively diethyl 4-cyano-hydroxycyclohexane-1,1-dicarboxylate as a viscous oily residue.

(b) Sodium acid sulfite (10 g.) is dissolved in water (30 ml.) and diethyl 4-oxocyclohexane-1,1-dicarboxylate (7.2 g.) is added thereto followed by stirring.

After 2 hours, potassium cyanide (6 g.) is added followed by stirring. After a further 2 hours, the oil layer formed is taken up with benzene, the extract being dried over sodium sulfate. After removal of the solvent, there is obtained diethyl 4-cyano-4-hydroxycyclohexane-1,1-dicarboxylate (7 g.).

The cyanhydrin compound obtained in a manner of (a) or (b) was identified by I.R. and T.L.C. In I.R. spectrum, there are shown absorptions of CN (2247 cm.$^{-1}$), OH (3450 cm.$^{-1}$) and ester (1730 cm.$^{-1}$). It is unstable and readily decomposed to the starting oxo-compound when it is distilled.

Example 2A.—Diethyl 4-cyano-3-cyclohexene-1,1-dicarboxylate [(III) where $R^1=R^2=C_2H_5$]

(a) Diethyl 4-cyano-4-hydroxycyclohexane-1,1-dicarboxylate (2.4 g.) is dissolved in pyridine (7 ml.) and thionyl chloride (2 g.) is added dropwise while stirring with ice-cooling. After stirring the resulting mixture for 2 hours and allowing it to stand overnight at a room temperature, ice-water is added thereto, excess thionyl chloride is decomposed and the mixture is then extracted with benzene, the extract being washed with an acid and alkali and dried on sodium sulfate. After removal of benzene by distillation, there is obtained a pale yellow oily product. It is then subjected to distillation in vacuo to afford diethyl 4-cyano-3-cyclohexene-1,1-dicarboxylate (1.6 g.) as an oily product having a boiling point of 140/6 mm. Hg.

(b) Phosphorus pentachloride (22 g.) is suspended in benzene (100 ml.) and diethyl 4-cyano-4-hydroxycyclohexane-1,1-dicarboxylate (20 g.) dissolved in benzene (70 ml.) is slowly added dropwise with stirring. After completion of the dropwise addition, the reaction solution is refluxed for 5 minutes, cooled and then poured onto ice, the benzene layer separated, washed with water and dried. Benzene is then removed therefrom and the residue is subjected to distillation under reduced pressure to give the desired product (18 g.).

It is confirmed by I.R. and T.L.C. that the products obtained by the methods (a) and (b) are identical, and they are found to be the desired product by N.M.R. and elemental analysis.

I.R. CN (2200 cm.$^{-1}$), ester (1735 cm.$^{-1}$), C=C (1645 cm.$^{-1}$), OH (3450 cm.$^{-1}$) has disappeared.

*Elemental analysis.*—Calcd. for $C_{13}H_{17}O_4N$ (percent): C, 62.14; H, 6.82; N, 5.57. Found (percent): C, 61.83, 61.65; H, 6.97, 7.15; N, 6.13, 5.96.

Example 2B.—4-cyano-3-cyclohexene-1,1-dicarboxylic acid [(III) where $R^1=R^2=H$]

(a) Diethyl 4-cyano-3-cyclohexene-1,1-dicarboxylate (2.5 g.), having been prepared in a manner as described in Example 1, is dissolved in ethanol (10 ml.) and a 20% aqueous sodium hydroxide solution (5 ml.) is added thereto followed by heating at a temperature of 70° C.

for half an hour. The reaction solution is concentrated under reduced pressure to half its volume, cooled and then made acidic with 10% hydrochloric acid, the resulting oily product being extracted with ether and the extract being dried on sodium sulfate followed by removal of the solvent by distillation to yield crude crystals (2.0 g.), which are further purified by recrystallization from a solvent mixture of acetone and benzene to give colorless crystals with a decomposition point of from 155 to 157° C. The product thus obtained was confirmed by element analysis, I.R., and N.M.R., to be 4-cyano-3-cyclohexene-1,1-dicarboxylic acid.

I.R. —COOH (2570 cm.$^{-1}$, 1745 cm.$^{-1}$ and 1715 cm.$^{-1}$), —C≡N (2225 cm.$^{-1}$) C=C (1640 cm.$^{-1}$).

Elemental analysis.—Calcd. for $C_9H_9O_4N$ (percent): C, 55.38; H, 4.65; N, 7.18. Found (percent): C, 54.84, 55.38, 55.25; H, 4.89, 4.87, 5.03; N, 6.89, 7.18, 6.80.

(b) A 20% aqueous sodium hydroxide solution is added to 4-cyano-3-cyclohexene-1,1-dicarboxylic acid monomethyl ester (0.5 g.) and the resulting mixture is then heated at a temperature of 70° C. for half an hour, allowed then to cool, made acidic with 10% hydrochloric acid, the resulting oily product being extracted with ether. After drying the ethereal extract, ether is removed by distillation and the residue is washed with benzene to obtain 0.4 g. of crude crystals having a decomposition point of from 152 to 154° C. According to I.R. and T.L.C., the product so obtained was found to be identical with 4-cyano-3-cyclohexene-1,1-dicarboxylic acid obtained in the manner described in (a).

(c) Using 4-cyano-4-hydroxycyclohexane-1,1-dicarboxylic acid, the treatment as described in (a) or (b) of the Example 2A is repeated to obtain the titled desired product.

Example 2C.—4-cyano-3-cyclohexene-1,1-dicarboxylic acid monoethyl ester [(III) where $R^1=C_2H_5$, $R^2=H$]

Diethyl 4-cyano-3-cyclohexene-1,1-dicarboxylate (2.5 g.) prepared in a manner as described in the Example 1 is dissolved in ethanol (10 ml.), and a 20% aqueous sodium hydroxide solution is added thereto with stirring. After 2 minutes, the resulting mixture is made acidic with 10% hydrochloric acid, and the resulting oily product is extracted with ether, the ethereal extract being dried over sodium sulfate and ether removed by distillation to give 2.3 g. of oily residue. The residue is immediately crystallized and the crystals are recrystallized from benzene to obtain 4-cyano-3-cyclohexene-1,1-dicarboxylic acid monoethyl ester as crystals having a melting point of from 108 to 110° C. The structure of the product may be identified by elemental analysis, I.R. and N.M.R.

Analysis.—Calcd. for $C_{11}H_{13}O_4N$ (percent): C, 59.18; H, 5.87; N, 6.25. Found (percent): C, 59.08, 59.56; H, 6.17, 6.30; N, 6.20, 6.30.

Example 2D.—4-cyano-3-cyclohexene-1,1-dicarboxylic acid monomethyl ester [(III) where $R^1=CH_3$, $R^2=H$]

Diethyl 4-cyano-3-cyclohexene-1,1-dicarboxylate prepared in a manner as described in Example 1 is added to a 5% solution of sodium hydroxide in methanol and water is added thereto. The resulting mixture is heated for 3 minutes on a water bath and then treated in a manner as described in the Example 3 to give the transesterified and hydrolyzed product, 4-cyano-3-cyclohexene-1,1-dicarboxylic acid monomethyl ester. After recrystallization from benzene, there is obtained a pure product having a melting point of from 105 to 107° C.

Elemental analysis.—Calcd. for $C_{10}H_{11}O_4N$ (percent): C, 57.41; H, 5.30; N, 6.70. Found (percent): C, 57.48, 57.31; H, 5.57, 5.57; N, 6.64, 6.70.

Example 3A.—Diethyl 4-aminomethylcyclohexane-1,1-dicarboxylate [(II) where $R^1=R^2=C_2H_5$]

Diethyl 4-cyano-3-cyclohexene-1,1-dicarboxylate (15.0 g.) is dissolved in methanol (15 ml.), and Raney-nickel (15 ml.) and concentrated aqueous ammonia (15 ml.) are added thereto to carry out catalytic reduction while passing hydrogen through at room temperature until the theoretical amount of hydrogen is taken up. Subsequently the catalyst is removed by filtration and the filtrate is concentrated under reduced pressure at low temperatures. Dilute hydrochloric acid-solubles are then extracted from the residue, the acid solution being neutralized with sodium carbonate and ether added thereto followed by separation. The ether layer is washed with water, the washes united together with the water layer on the separation and subjected to concentration under reduced pressure at low temperatures. Ethyl acetate is added to the resulting concentrated solution, the ethyl acetate layer being washed with saturated aqueous sodium chloride solution, dried on sodium sulfate and concentrated. The residue is diethyl 4-aminocyclohexane-1,1-dicarboxylate which is identified by I.R. and N.M.R. The yield of the product is 13.8 g. (90%).

Elemental analysis of the picrate, M.P. 203–5° C. (after recrystallization from ethyl acetate).— $C_{19}H_{26}N_4O_{11}$: Theoretical value (percent): C=46.91; H=5.91; N=11.52. Found value (percent): C=46.69, 46.77; H=5.62, 5.59; N=11.17, 11.46.

Example 3B.—4-aminomethylcyclohexane-1,1-dicarboxylic acid [(II) where $R^1=R^2=H$]

(a) 4-cyano-3-cyclohexene-1,1-dicarboxylic acid (2.0 g.) is dissolved in methanol (20 ml.), and a concentrated aqueous ammonia solution (20 ml.) and Raney-nickel (2 ml.) are added to carry out catalytic reduction while passing hydrogen through at a room temperature until the theoretical amount of hydrogen is taken up. Then the catalyst is removed from the reaction solution by filtration, the filtrate is concentrated and the residue is, after adding thereto water, treated with an ion-exchange resin, the passed solution being concentrated under reduced pressure and the residue being recrystallized from water to obtain 1.6 g. of 4-aminomethylcyclohexane-1,1-dicarboxylic acid having a melting point (decomposing point) of 225° C. The product was identified as the product obtained in the manner hereinafter described (b).

(b) The method for preparing the desired product by hydrolysis of the diethylester from the Example 3A is effected in the following manner:

Diethyl 4-aminomethylcyclohexane-1,1-dicarboxylate prepared in Example 3A (0.5 g.) is dissolved in a 10% aqueous hydrochloric acid solution and the resulting solution is refluxed for 3.5 hours. The resulting reaction solution is concentrated and the residue is washed with ethanol to obtain 0.3 g. of 4-aminomethylcyclohexane-1,1-dicarboxylic acid hydrochloride. M.P. 203° C. (decomp.).

Elemental analysis of the hydrochloride.—

$C_9H_{16}NO_4Cl$

Theoretical value (percent): C=45.48; H=6.79; N=5.89. Found value (percent): C=45.56, 45.62; H=7.22, 6.99; N=5.85, 5.85.

The hydrochloride is identified as the desired product also by I.R. and N.M.R.

Another embodiment is given below:

Diethyl 4-aminomethylcyclohexane-1,1-dicarboxylate (0.4 g.) prepared in the Example 3A is dissolved in water-containing ethanol containing 0.4 g. of caustic soda and the resulting solution is refluxed for 4 hours. The reaction solution is then concentrated under reduced pressure and a solution of the residue in water is passed through a weakly acidic ion-exchange resin Amberlite IRC-50 (H-type), the passed solution being concentrated to obtain 0.31 g. of 4-aminomethylcyclohexane-1,1-dicarboxylic acid, which, after recrystallization from $H_2O$, shows a melting point of 225° C. (decomposition).

Elemental analysis.—$C_9H_{15}NO_4$: Theoretical value (percent): C=53.72; H=7.51; N=6.96. Found value (percent): C=53.53, 53.51; H=7.77, 7.37; N=6.93, 6.97.

The product is identified as the desired one also from I.R. and N.M.R.

Example 4A.—4 - aminomethylcyclohexane-1-carboxylic acid (I). [Manufacture of (I) from (II) where R¹=R²=H]

4 - aminomethylcyclohexane - 1,1-dicarboxylic acid (1.0 g.) is dissolved in 60% sulfuric acid followed by heating the solution on an oil bath at bath temperatures of from 150 to 160° C. for about one hour. The reaction solution is then treated with an ion-exchange resin, the passed liquid being concentrated under reduced pressure to give 4-aminomethylcyclohexane-1-carboxylic acid (0.73 g.). The product softens at 250° C. and melts above 300° C. It is then converted to the hydrochloride and the trans-isomer is separated from the cis-isomer by fractionating crystallization from alcohol, each of the trans- and cis-isomer being treated with an ion-exchange resin to obtain the cis-isomer (0.07 g.) and trans-isomer (0.63 g.) of 4-aminomethylcyclohexane-1-carboxylic acid.

Example 4B.—4 - aminomethylcyclohexane-1-carboxylic acid (I). [Manufacture of (I) from (II) where R¹=R²=C₂H₅]

Diethyl 4 - aminomethylcyclohexane - 1,1-dicarboxylate (1.0 g.) is dissolved in concentrated hydrochloric acid (4 c.c.) and the resulting solution is refluxed for about 50 hours. The resulting reaction solution is then concentrated under reduced pressure and the residue, after being dissolved in a small amount of water, passed through an ion-exchange resin, the passed liquid being concentrated under reduced pressure to obtain 4-aminomethylcyclohexane - 1 - carboxylic acid (0.55 g.). The product softens at 230° C. and decomposes at 300° C. The crystals are treated in the same manner as described in Example 4A to obtain the cis-isomer (0.16 g.) and the trans-isomer (0.37 g.).

Another embodiment is as follows.

Diethyl 4 - aminomethylcyclohexane - 1,1 - dicarboxylate (50.5 g.) dissolved in concentrated hydrobromic acid (d=1.48 or more; 300 ml.) is heated to reflux for about 25 hours and then concentrated in vacuo to recover hydrobromic acid (d=1.40 [42%]; 265 ml.). Water is added to the residue, the mixture is filtered to remove insoluble matters (0.17 g.), the filtrate is passed through Amberlite IR-48 (OH form), then the resulting solution is passed through a small amount of Amberlite IRC-50 (H form), the solution is concentrated, and the concentrate is well dried to give 25 g. of 4-aminomethylcyclohexane - 1 - carboxylic acid. This is treated as same manner as in Example 4A to afford 17.1 g. trans-isomer and 6.9 g. cis-isomer.

What we claim is:

1. The process for the preparation of predominantly trans - 4 - aminomethylcyclohexane - 1 - carboxylic acid which comprises treating a di(lower alkyl) ester of 4-oxo-1,1-dicarboxylic acid with sodium or potassium cyanide to yield the corresponding diester of 4-cyano-4-hydroxycyclohexane - 1,1-dicarboxylic acid, dehydrating said diester of 4 - cyano-4-hydroxycyclohexane-1,1-dicarboxylic acid to yield the corresponding diester of 4-cyanocyclohex-3-ene-1,1-dicarboxylic acid, catalytically reducing said diester of 4 - cyanocyclohex - 3 - ene-1,1-dicarboxylic acid to yield the corresponding diester of 4-aminomethylcyclohexane-1,1-dicarboxylic acid, and decarboxylating and hydrolyzing said diester of 4-aminomethylcyclohexane-1,1-dicarboxylic acid by heating a solution thereof with a mineral acid at temperatures in the range of from 100° to 230° C.

2. The process for the preparation of predominantly trans - 4 - aminomethylcyclohexane-1-carboxylic acid which comprises heating a solution of a compound of the formula:

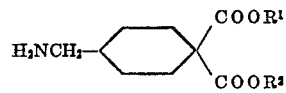

wherein R¹ and R² are hydrogen or lower alkyl in a mineral acid at temperatures in the range of from 100° to 230° C. to effect decarboxylation.

3. The process according to claim 2 wherein R¹ and R² are hydrogen.

4. The process according to claim 2 wherein the mineral acid is sulfuric acid.

5. The process according to claim 2 wherein the mineral acid is hydrobromic acid.

6. The process according to claim 2 wherein R¹ and R² are both lower alkyl.

References Cited

FOREIGN PATENTS

| 436,938 | 3/1968 | Japan | 260—468 |
| 436,939 | 3/1968 | Japan | 260—468 |
| 1,097,313 | 1/1968 | Great Britain | 260—514 |

OTHER REFERENCES

March, Advanced Org. Chem., pp. 477–480 (1968).

LORRAINE A. WEINBERGER, Primary Examiner

R. GERSTL, Assistant Examiner

U.S. Cl. X.R.

260—464, 468 J, 468 K, 514 K